United States Patent Office 3,577,319
Patented May 4, 1971

3,577,319
**LARGE SCALE CULTIVATION OF *BORDETELLA PERTUSSIS* CELLS FOR VACCINE PRODUCTION**
Peter Adams Nielsen, Ridgewood, Murray Sam Cooper, Dumont, and Ernest Robert Doyno, Woodcliff Lake, N.J., assignors to American Cyanamid Company, Stamford, Conn.
No Drawing. Filed May 27, 1968, Ser. No. 732,063
Int. Cl. C12k *3/00*
U.S. Cl. 195—96                                                 6 Claims

ABSTRACT OF THE DISCLOSURE

A *Bordetella pertussis* vaccine is prepared by deep tank cultivation using a seed grown in a biphasic culture system. The process eliminates cultivation on a blood-free seed agar, reduces the number of containers, and results in increased antigenicity of the phase I *Bordetella pertussis* vaccine.

BACKGROUND OF THE INVENTION

*Bordetella pertussis* vaccines have been prepared from killed *Bordetella pertussis* cells which have been grown in a culture medium involving the following steps: The organism is first grown on blood agar slants and is then subcultured on blood-free agar to produce a seed. This seed is used for inoculating bottles, for example 4-liter bottles, containing a suitable growth medium. After suitable growth of *Bordetella pertussis*, the organisms are killed and suitably suspended, for example in isotonic saline solution. A mixture of cell suspensions of at least two strains of *Bordetella pertussis* constitutes the vaccine. The process has two general drawbacks: The first is that there are a number of separate steps, including the subculturing on the blood-free agar, and the final growth is in comparatively small containers, both of which procedures add to the cost of producing the vaccine. An even more serious drawback is that the antigenicity of the phase I *Bordetella pertussis* in the vaccine shows considerable decrease. In other words, the vaccine is not only more expensive to produce but is less effective in producing antibodies.

SUMMARY OF THE INVENTION

The present invention consists essentially of a different process in which the first step is the same as before, that is to say, the culturing of the strains of *Bordetella pertussis* on blood agar slants. The subculturing on blood-free agar slants is omitted entirely and the organisms from the culture on the blood agar slants are grown in a biphasic culture system consisting of charcoal agar medium overlaid with a liquid medium. After suitable growth, the liquid portion is used to inoculate broth media in relatively large and deep tanks, for example 20 gallons or more. After suitable growth in the tanks the organisms are killed, separated from the broth, and then suspended in saline to produce the final vaccine. This last step is the same as in the process formerly used. Also as in the former process, the operations are carried out as nearly aseptically as possible, that is to say, aseptic as far as contamination with other orgnisms is concerned, but because of the fewer steps and smaller number of containers it is easier to maintain aseptic conditions and so fewer batches become contaminated and lost.

It will be obvious that elimination of one of the steps, subculturing on blood-free agar, and the use of larger cultivation containers reduces labor and other costs so that a vaccine can be produced more economically. However, an even more important advantage lies in the fact that for some reason the cultivation on blood-free agar slants reduces the antigenicity of phase I *Bordetella pertussis*. This is, of course, very important, because maximum antigenicity in a vaccine is desired to assure maximum reliability of antibody formation and hence immunization. Just why the elimination of the subculturing on blood-free agar slants should result in improved antigenicity is not known, and it is therefore not intended to limit the present invention to any theory of why this surprising increase or improvement in antigenicity results. It is, however, a fact, and therefore the vaccines produced by the process of the present invention constitute improved products.

The process of the present invention is useful generally with various strains of *Bordetella pertussis*, for example one received from the Michigan State Department of Health, labeled 18323; another from New York State Laboratory, labeled 41405; two other strains from the Michigan State Department of Health, labeled Nos. 18334–L3 and 19–676L2. Also, the process has been used with several strains obtained from the Wyeth Institute of Biochemistry, one of them labeled Kendrick No. 10536. The process of the present invention is, therefore, generally applicable and so far has not been found applicable to any strain of *Bordetella pertussis*. The general applicability is, of course, a practical advantage of the process.

The lowered costs and improved results of the process of the present invention are obtainable without requiring new or different growth media. The conventional media may be used, and typical operations will be described in more detail below.

When the killed *Bordetella pertussis* cells are separated from their cultivation broth, vaccines can be prepared either by suspending the intact, but killed, cells in a suitable medium, such as isotonic saline, or the cells may be disintegrated mechanically and aseptically. The excellent antigenicity of the vaccine is the same with either modification.

DESCRIPTION OF THE PREFERRED EMBODIMENT

The invention will be described in greater detail in conjunction with the following specific example, which is a typical one:

*Bordetella pertussis* (Michigan State Department of Health strain 18334–L3) was grown on charcoal agar contained in a Roux bottle, prepared as described in the article by Powell, Culberston and Ensminger, *Public Health Reports*, vol. 66, pages 345–348, and a portion of the growth was cultivated on blood agar slants, (Bordet-Gengou Modified—plus 25% sheep or rabbit blood). The inoculated slants were incubated at 35° C. Microscopic examination indicated that the culture was pure.

Twelve 4-liter bottles were prepared, each containing 600 ml. of the charcoal agar overlaid with 200 ml. of modified Cohen-Wheeler broth having the following composition:

| | |
|---|---|
| Casamino acids technical _____parts__ | 10.0 |
| Lederle peptone _____mg. N/ml__ | 750.0 |
| Sodium chloride _____parts__ | 2.5 |
| Monopotassium phosphate _____do____ | 0.5 |
| Magnesium chloride hexahydrate _____do____ | 0.4 |
| Starch, soluble, powdered _____do____ | 1.5 |
| Calcium chloride _____do____ | 0.01 |
| Ferrous sulfate heptahydrate _____do____ | 0.01 |
| Copper sulfate pentahydrate _____do____ | 0.005 |
| Cysteine hydrochloride _____do____ | 0.025 |
| Yeast dialyzate _____do____ | 100.0 |
| Distilled water _____do____ | 1000.0 |

The culture medium containing both the solid phase of charcoal agar and the liquid phase of the modified Cohen-Wheeler broth is referred to in the present specification as a "biphasic culture." This is in contrast to a single culture, in which there is only the broth without the charcoal agar. The botttles were inoculated with 2 ml. of cell suspensions from the blood agar cultures, incubated at 35° C., and were continuously shaken on a shaker operating at 70–75 strokes per minute. The incubation lasted for about 40–45 hours, and the broth portions of the biphasic cultures were consolidated to form a single source.

A fermentation tank containing approximately 200 liters of tap water was sterilized for 4½ hours at 120°–123° C. The tank was then cooled to 32°–38° C. and held overnight without agitation under about 5 pounds per square inch pressure of sterile air. The water was then drained from the fermentation tank, and a 175 liter portion of Modified Cohen-Wheeler Broth, described above, was pumped into the tank and sterilized for 45 minutes at 120°–123° C. The tank was then again cooled to 32–38° C. and held overnight under 5 pounds sterile air pressure.

The cultures from the pooled biphasic source were inoculated into the fermentation tank and growth permitted to continue for 27 hours at a temperature of 32°–38° C. with agitation and with the addition of sterile surface aeration at the rate of 10 cubic feet per minute.

After growth was complete, the contents of the tank was treated with a solution of sodium ethylmercurithiosalicylate in a concentration of 1:10,000 and heated at 56° C. for 30 minutes. This resulted in killing the *Bordetella pertussis* organisms. The tank contents were then cooled to about 20° C. and centrifuged at 15,000 r.p.m. The packed bacterial cells were removed by scraping from the walls of the centrifuge bowl and suspended in a phosphate-buffered 0.85% saline solution containing 0.01% sodium ethylmercurithiosalicylate. The cell suspension was then stored at 4° C. and constituted the vaccine stock. It contained between 37 and 38 protective units per normal human dose, (1.5 ml.). The vaccine showed substantially increased antigenicity for phase I *Bordetella pertussis* over vaccine produced by the conventional method. The results of a typical test appear in Table I below.

TABLE I

| Medium | Inoculum | | | | Production culture | | | |
|---|---|---|---|---|---|---|---|---|
| | Age, hr. | Turbidity [1] | pH | Volume, ml. | Age, hrs. | Turbidity [1] | pH | Potency [2] |
| Liquid only__ | 41 | 39.0 | 7.87 | 6,000 | 28.5 | 41.8 | 8.13 | 15.0 |
| Liquid only__ | 41 | 38.0 | 7.78 | 6,000 | 33.5 | 30.8 | 7.90 | 20.7 |
| Biphasic_____ | 46 | 108.3 | 8.02 | 1,600 | 28.0 | 39.7 | 8.00 | 26.8 |
| Biphasic_____ | 48 | 114.8 | 7.79 | 2,000 | 27.0 | 42.5 | 7.98 | 37.6 |

[1] Turbidity in opacity units per milliliter.
[2] Potency in protective units per total human dose.

All of the procedures described above in the example were carried out under the customary aseptic conditions, and the final vaccine was uncontaminated by undesired organisms. Maintenance of aseptic conditions was much simplified by elimination of the large number of containers formerly required.

The whole *Bordetella pertussis* vaccine described above can be used as such after suitable dilution, or the cells can be disrupted aseptically in the conventional manner to produce a non-cellular pertussis vaccine. In either case the improved antigenicity of phase I *Bordetella pertussis* was retained.

We claim:
1. A process of producing *Bordetella pertussis* vaccine which comprises,
    (a) producing seed cultures of *Bordetella pertussis* on blood agar slants,
    (b) inoculating a biphasic growth system comprising a liquid medium over charcoal agar with said seed cultures,
    (c) inoculating a growth broth in a deep fermentation tank with growth from the biphasic culture system,
    (d) incubating the broth at a temperature 32°–38° C., and
    (e) killing the *Bordetella pertussis* bacteria and separating the killed bacteria from the broth.
2. A process according to claim 1 in which the broth is a modified Cohen-Wheeler broth.
3. A process according to claim 2 in which the killed and separated *Bordetella pertussis* bacteria are suspended in isotonic saline.
4. A process according to claim 1 in which the killed and separated *Bordetella pertussis* bacteria are suspended in isotonic saline.
5. A process according to claim 1 in which the separated killed *Bordetella pertussis* bacteria are aseptically disrupted and suspended in saline.
6. A process according to claim 2 in which the separated killed *Bordetella pertussis* bacteria are aseptically disrupted and suspended in saline.

References Cited

UNITED STATES PATENTS

| | | | |
|---|---|---|---|
| 3,035,980 | 5/1962 | Tint et al. | 195—96 |
| 3,141,824 | 7/1964 | Dahlstrom | 195—96 |

ALVIN E. TANENHOLTZ, Primary Examiner

U.S. Cl. X.R.

424—92